United States Patent
Rosenthal et al.

(10) Patent No.: US 12,516,383 B2
(45) Date of Patent: Jan. 6, 2026

(54) METHODS FOR DETECTING HEREDITARY CANCERS

(71) Applicant: Quest Diagnostics Investments LLC, Secaucus, NJ (US)

(72) Inventors: Sun Hee Rosenthal, San Juan Capistrano, CA (US); Weimin Sun, Irvine, CA (US); Ke Zhang, San Clemente, CA (US); Anna Gerasimova, San Juan Capistrano, CA (US); Andrew Grupe, San Juan Capistrano, CA (US); Felicitas Lacbawan, San Juan Capistrano, CA (US)

(73) Assignee: Quest Diagnostics Investments LLC, Secaucus, NJ (US)

( * ) Notice: Subject to any disclaimer, the term of this patent is extended or adjusted under 35 U.S.C. 154(b) by 1026 days.

(21) Appl. No.: 17/628,100

(22) PCT Filed: Jul. 17, 2020

(86) PCT No.: PCT/US2020/042563
§ 371 (c)(1),
(2) Date: Jan. 18, 2022

(87) PCT Pub. No.: WO2021/016089
PCT Pub. Date: Jan. 28, 2021

(65) Prior Publication Data
US 2022/0275457 A1    Sep. 1, 2022

Related U.S. Application Data

(60) Provisional application No. 62/876,552, filed on Jul. 19, 2019.

(51) Int. Cl.
*C12Q 1/6886*    (2018.01)
(52) U.S. Cl.
CPC .................... *C12Q 1/6886* (2013.01)
(58) Field of Classification Search
CPC .................. C12Q 1/6886; C12Q 2600/156
See application file for complete search history.

(56) References Cited

U.S. PATENT DOCUMENTS

| | | | |
|---|---|---|---|
| 9,291,625 B2 | 3/2016 | Semizarov et al. | |
| 2015/0344966 A1 | 12/2015 | Timms et al. | |
| 2018/0089373 A1 | 3/2018 | Matsuguchi et al. | |
| 2018/0135135 A1* | 5/2018 | Sanders | C12Q 1/6806 |

FOREIGN PATENT DOCUMENTS

| | | |
|---|---|---|
| CN | 103981273 A | 8/2014 |
| CN | 105339507 A | 2/2016 |
| CN | 105779572 A | 7/2016 |
| CN | 105986031 A | 10/2016 |
| CN | 106498082 A | 3/2017 |
| CN | 108699553 A | 10/2018 |
| CN | 109161591 A | 1/2019 |
| WO | WO-2014/130890 A1 | 8/2014 |
| WO | WO-2017/117523 A1 | 7/2017 |
| WO | WO-2018/093724 A1 | 5/2018 |
| WO | WO-2019/029807 A1 | 2/2019 |

OTHER PUBLICATIONS

Ye et al. (BMC Bioinformatics 2012, 13:134, 11 pages) (Year: 2012).*
NCBI-PMS2 (NCBI Reference Sequence: NM_001406878.1, previously published 1994) (Year: 1994).*
NCBI-CHEK2 (NCBI Reference Sequence: NG_008150.2, previously published 2018) (Year: 2018).*
Kapoor et al., "Multigene Panel Testing Detects Equal Rates of Pathogenic BRCA1/2 Mutations and has a Higher Diagnostic Yield Compared to Limited BRCA1/2 Analysis Alone in Patients at Risk for Hereditary Breast Cancer," Ann. Surg. Oncol., Jul. 29, 2015, 22(10):3282-3288.
Mu et al., "Detection of structural variation using target captured next-generation sequencing data for genetic diagnostic testing," Genetics in Medicine, Jul. 2019 (online Dec. 19, 2018), 21(7):1603-1610.
Supplementary European Search Report dated Aug. 24, 2023 in EP 20844977.7.
Adzhubel et al., "A method and server for predicting damaging missense mutations," Nat. Methods, Apr. 2010, 7(4):248-249.
International Search Report and Written Opinion dated Oct. 7, 2020 in PCT/US2020/042563.
Rosenthal et al., "Development and Validation of a 34-Gene Inherited Cancer Predisposition Panel Using Next-Generation Sequencing," BioMed Research International, Jan. 23, 2020, 2020:6289023, 1-10.
Office Action dated Jun. 9, 2025 in CN 2020800629500, with English translation.

* cited by examiner

*Primary Examiner* — Robert H Havlin
(74) *Attorney, Agent, or Firm* — DUANE MORRIS LLP

(57) ABSTRACT

The disclosure relates to a genetic inheritance cancer predisposition panel utilizing targeted capture-based next-generation sequencing—the panel incorporates genes underlying well-characterized cancer syndromes and those associated with increased cancer risk. The disclosure further relates to methods of utilizing the genetic inheritance cancer predisposition panel for determining a cancer risk assessment for individuals with hereditary cancers and/or cancer syndromes.

9 Claims, No Drawings
Specification includes a Sequence Listing.

SEQUENCE LISTING

```
<160> NUMBER OF SEQ ID NOS: 4

<210> SEQ ID NO 1
<211> LENGTH: 26
<212> TYPE: DNA
<213> ORGANISM: Artificial Sequence
<220> FEATURE:
<223> OTHER INFORMATION: Primer Sequence -  CHEK2-Fm3 - Chr22:
      29083090+29083115

<400> SEQUENCE: 1
ggtagacctg tatctttatg agggcg                                        26

<210> SEQ ID NO 2
<211> LENGTH: 27
<212> TYPE: DNA
<213> ORGANISM: Artificial Sequence
<220> FEATURE:
```

```
<223> OTHER INFORMATION: Primer Sequence - CHEK2-R - Chr22:29092838-
      29092864

<400> SEQUENCE: 2
ggctattcct gtagattctt gttcaga                                            27

<210> SEQ ID NO 3
<211> LENGTH: 25
<212> TYPE: DNA
<213> ORGANISM: Artificial Sequence
<220> FEATURE:
<223> OTHER INFORMATION: Primer Sequence - PMS2-LR3 F - Chr7:6029559-
      6029583

<400> SEQUENCE: 3
gcgttgatat caatgttact ccaga                                              25

<210> SEQ ID NO 4
<211> LENGTH: 25
<212> TYPE: DNA
<213> ORGANISM: Artificial Sequence
<220> FEATURE:
<223> OTHER INFORMATION: Primer Sequence - PMS2-LR3 Rm -
      Chr7:6011242+6011266 chr7:6792788-6792812

<400> SEQUENCE: 4
tccttccatc tccaaaacca gcaag                                              25
```

METHODS FOR DETECTING HEREDITARY CANCERS

CROSS-REFERENCE TO RELATED APPLICATIONS

This application is the U.S. National Stage of PCT/US2020/042563, filed Jul. 17, 2020, which claims the benefit of priority to U.S. Provisional Application No. 62/876,552 filed Jul. 19, 2019, which is herein incorporated by reference in its entirety.

The instant application contains a Sequence Listing which has been submitted in ASCII format via EFS-WEB and is hereby incorporated by reference in its entirety. Said ASCII copy, created on Jan. 17, 2021, is named 034827_1839_SeqList.txt and is 1,215 bytes.

FIELD

The ability to identify individuals with hereditary cancers efficiently and in a cost-effective manner is of great importance given that they account for 5% to 10% of all cancers. The genetic basis of hereditary cancers must be interrogated across multiple genes or loci considering that the basis is often not a single point mutation, rather it is a confluence of genes or loci that are associated with hereditary cancers. There is a need for multi-gene or multi-locus tests that can be utilized in a cost-effective and efficient manner to detect clinically actionable mutations in individuals.

STATEMENT REGARDING SEQUENCE LISTING

The sequence listing associated with this application is provided in text format in lieu of a paper copy, and is hereby incorporated by reference into the specification. The name of the text file containing the sequence listing is 034827_1716_SeqList_ST25.txt. The text file is 4 kb, was created on Jul. 17, 2019, and is being submitted electronically via EFS-Web.

SUMMARY OF THE DISCLOSURE

In some aspects, the disclosure is generally drawn to a method for detecting at least one mutation in a plurality of hereditary cancer-related genes in a biological sample, the method comprising: (a) extracting genomic DNA from a biological sample obtained from a patient, (b) generating a library comprising a plurality of bait-captured gene sequences corresponding to each of the plurality of hereditary cancer-related genes from the genomic DNA extracted in (a), the plurality of hereditary cancer-related genes comprising APC, ATM, BARD1, BMPR1A, BRCA1, BRCA2, BRIP1, CDH1, CDK4, CDKN2A, EPCAM, MEN1, MLH1, MSH2, MSH6, MUTYH, NBN, NF1, PALB2, POLD1, POLE, PTEN, RAD51C, RAD51D, RET, SDHB, SDHC, SDHD, SMAD4, STK11, and TP53; and (c) detecting at least one mutation in at least one of the plurality of bait-captured gene sequences using high throughput massive parallel sequencing.

In some embodiments, the biological sample is plasma, serum, or whole blood. In one embodiment, the biological sample is a dried human biological sample. In some embodiments, detecting at least one mutation in at least one of the plurality of bait-captured gene sequences indicates an increased susceptibility to hereditary cancer in the patient.

Additionally or alternatively, in some embodiments, the ends of the plurality of bait-captured gene sequences comprise an adapter sequence. Examples of adapter sequences include P5 adapters, P7 adapters, P1 adapters, A adapters, or Ion Xpress™ barcode adapters.

In certain embodiments, the high throughput massive parallel sequencing is performed using pyrosequencing, reversible dye-terminator sequencing, SOLiD sequencing, Ion semiconductor sequencing, Helioscope single molecule sequencing, sequencing by synthesis, sequencing by ligation, or SMRT™ sequencing.

In some embodiments, the method further comprises amplifying exons 11 to 15 of PMS2 using long-range PCR to generate a plurality of PMS2 amplicons and detecting at least one mutation in at least one of the plurality of PMS2 amplicons using high throughput massive parallel sequencing. The plurality of PMS2 amplicons may or may not include an adaptor sequence. Additionally or alternatively, in some embodiments, the method further comprises amplifying exons 11 to 15 of CHEK2 using long-range PCR to generate a plurality of CHEK2 amplicons and detecting at least one mutation in at least one of the plurality of CHEK2 amplicons using high throughput massive parallel sequencing. The plurality of CHEK2 amplicons may or may not include an adaptor sequence.

In certain embodiments, exons 11 to 15 of CHEK2 are amplified using a forward primer comprising the sequence of SEQ ID NO:1 and a reverse primer comprising the sequence of SEQ ID NO:2 to generate the CHEK2 amplicons. In certain embodiments, exons 11 to 15 of PMS2 are amplified using a forward primer comprising the sequence of SEQ ID NO:3 and a reverse primer comprising the sequence of SEQ ID NO:4 to generate the PMS2 amplicons.

In some embodiments, the specificity of detecting at least one mutation in PMS2 and CHEK2 is increased relative to a method that does not perform long-range PCR of exons 11-15 of PMS2 and CHEK2 prior to performing high throughput massive parallel sequencing. In certain embodiments, the detection interference from pseudogenes is decreased relative to a method that does not perform long-range PCR of exons 11-15 of PMS2 and CHEK2 prior to performing high throughput massive parallel sequencing.

The summary of the disclosure described above is non-limiting and other features and advantages of the disclosure will be apparent from the following detailed description of the disclosure, examples, and the claims.

DETAILED DESCRIPTION OF THE DISCLOSURE

It is important to identify individuals with hereditary cancer efficiently and in a cost-effective manner, as they account for 5-10% of all cancers (1). Over the last few years, rapid advances in next-generation sequencing (NGS) technologies has allowed simultaneous interrogation of multiple genes. NGS technologies perform at higher throughput than Sanger sequencing, since they work in a massively parallel manner (2). As a result, multigene panel tests utilizing NGS can be a cost-effective and efficient way to detect clinically actionable mutations in appropriately selected patients. Their use may increase detection of pathogenic mutations compared to single-gene testing.

Identifying hereditary cancer susceptibility in an individual with a personal and/or family history can be complex. Pathogenic/likely pathogenic variants in multiple genes can be associated with cancer in a specific organ. For example, ovarian cancer is associated with pathogenic/likely pathogenic variants in multiple genes such as BRCA1, BRCA2, MLH1, MSH2, RAD51C, and RAD51D (5-11). On the other hand, pathogenic/likely pathogenic variants in a single gene can increase the risk for more than 1 type of cancer. Women with Lynch syndrome due to MLH1 pathogenic variants have an increased risk of specific cancers, including cancer of the colon or rectum (52-82%), uterus (25-60%), ovary (4-24%), stomach, urinary tract, pancreas, small bowel, hepatobillary tract, and brain (7-9 and 12-19).

Several professional societies have published guidelines that support and define genetic testing for hereditary cancer syndromes. These societies acknowledge that mutigene panel testing may benefit individuals when their histories are consistent with multiple possible hereditary cancer syndromes or when a syndrome can be caused by multiple genes (20 and 21). These panels are also informative for families with a limited structure, when family history information is limited, and when the history of cancer is strong but targeted testing has been negative (18 and 22-27). Guidelines, however, do not currently provide guidance on when multigene panel testing may provide actionable additional information for individuals whose histories do not meet these criteria.

The disclosure describes the development and validation of a 34-gene inherited cancer predisposition panel using NGS for single-nucleotide variants (SNVs), insertions and deletions (Indels), and exon-level copy number variants (CNVs). The disclosure further provides variant detection yield of the panel by summarizing deidentified results from 500 consecutive patient specimens submitted for clinical testing with the 34-gene panel.

While the following terms are believed to be well understood by one of ordinary skill in the art, the following definitions are set forth to facilitate explanation of the presently disclosed subject matter.

The term "a" or "an" may refer to one or more of that entity, i.e. can refer to plural referents. As such, the terms "a" or "an", "one or more" and "at least one" are used interchangeably herein. In addition, reference to "an element" by the indefinite article "a" or "an" does not exclude the possibility that more than one of the elements is present, unless the context clearly requires that there is one and only one of the elements.

Reference throughout this specification to "one embodiment", "an embodiment", "one aspect", or "an aspect" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

As used herein, the terms "about" or "approximately" when preceding a numerical value indicates the value plus or minus a range of 10% of the value.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The term "adapter" refers to a short, chemically synthesized, nucleic acid sequence which can be used to ligate to the end of a nucleic acid sequence in order to facilitate attachment to another molecule. The adapter can be single-stranded or double-stranded. An adapter can incorporate a short (typically less than 50 base pairs) sequence useful for PCR amplification or sequencing.

As used herein, an "alteration" of a nucleic acid sequence, a gene, or a gene product (e.g., a primer, a marker gene, or gene product) refers to the presence of a mutation or mutations within the gene or gene product, e.g., a mutation, which affects the quantity or activity of the gene or gene product, as compared to the normal or wild-type gene. The genetic alteration can result in changes in the quantity, structure, and/or activity of the gene or gene product in a cancer tissue or cancer cell, as compared to its quantity, structure, and/or activity, in a normal or healthy tissue or cell (e.g., a control). For example, an alteration which is associated with cancer can have an altered nucleotide sequence (e.g., a mutation), amino acid sequence, chromosomal translocation, intra-chromosomal inversion, copy number, expression level, protein level, protein activity, in a cancer tissue or cancer cell, as compared to a normal, healthy tissue or cell. Exemplary mutations include, but are not limited to, point mutations (e.g., silent, missense, or nonsense), deletions, insertions, inversions, linking mutations, duplications, translocations, inter- and intra-chromosomal rearrangements. Mutations can be present in the coding or non-coding region of the gene. In certain embodiments, the alterations are associated with a phenotype, e.g., a cancerous phenotype (e.g., one or more of cancer risk, cancer progression, cancer treatment or resistance to cancer treatment).

As used herein, an "amount" of an analyte in a body fluid sample refers generally to an absolute value reflecting the mass of the analyte detectable in volume of sample. However, an amount also contemplates a relative amount in comparison to another analyte amount. For example, an amount of an analyte in a sample can be an amount which is greater than a control or normal level of the analyte normally present in the sample.

As used herein, the terms "amplify" or "amplification" with respect to nucleic acid sequences, refer to methods that increase the representation of a population of nucleic acid sequences in a sample. Copies of a particular target nucleic acid sequence generated in vitro in an amplification reaction are called "amplicons" or "amplification products". Amplification may be exponential or linear. A target nucleic acid may be DNA (such as, for example, genomic DNA and cDNA) or RNA. While the exemplary methods described hereinafter relate to amplification using polymerase chain reaction (PCR), numerous other methods such as isothermal methods, rolling circle methods, etc., are well known to the skilled artisan. The skilled artisan will understand that these other methods may be used either in place of, or together with, PCR methods. See, e.g., Saiki, "*Amplification of Genomic DNA*" in PCR PROTOCOLS, Innis et al., Eds., Academic Press, San Diego, Calif 1990, pp 13-20; Wharam, et al., *Nucleic Acids Res.* 29(11):E54-E54 (2001)

As used herein, the term "bait" is a type of hybrid capture reagent that retrieves target nucleic acid sequences for sequencing. A bait can be a nucleic acid molecule, e.g., a DNA or RNA molecule, which can hybridize to (e.g., be complementary to), and thereby allow capture of a target nucleic acid. In one embodiment, a bait is an RNA molecule (e.g., a naturally-occurring or modified RNA molecule); a DNA molecule (e.g., a naturally-occurring or modified DNA molecule), or a combination thereof. In other embodiments, a bait includes a binding entity, e.g., an affinity tag, that allows capture and separation, e.g., by binding to a binding entity, of a hybrid formed by a bait and a target nucleic acid hybridized to the bait. In one embodiment, a bait is suitable for solution phase hybridization. As used herein, "bait set" refers to one or a plurality of bait molecules.

As used herein, the terms "cancer" or "tumor" are used interchangeably and refer to the presence of cells possessing characteristics typical of cancer-causing cells, such as uncontrolled proliferation, immortality, metastatic potential, rapid growth and proliferation rate, and certain characteristic morphological features. Cancer cells are often in the form of a tumor, but such cells can exist alone within an animal, or can be a non-tumorigenic cancer cell. As used herein, the term "cancer" includes premalignant, as well as malignant cancers.

As used herein, the terms "complement", "complementary" or "complementarity" with reference to polynucleotides (i.e., a sequence of nucleotides such as an oligonucleotide or a target nucleic acid) refer to the Watson/Crick base-pairing rules. The complement of a nucleic acid sequence as used herein refers to an oligonucleotide which, when aligned with the nucleic acid sequence such that the 5' end of one sequence is paired with the 3' end of the other, is in "antiparallel association." For example, the sequence "5'-A-G-T-3'" is complementary to the sequence "3'-T-C-A-5'." Certain bases not commonly found in naturally-occurring nucleic acids may be included in the nucleic acids described herein. These include, for example, inosine, 7-deazaguanine, Locked Nucleic Acids (LNA), and Peptide Nucleic Acids (PNA). Complementarity need not be perfect; stable duplexes may contain mismatched base pairs, degenerative, or unmatched bases. Those skilled in the art of nucleic acid technology can determine duplex stability empirically considering a number of variables including, for example, the length of the oligonucleotide, base composition and sequence of the oligonucleotide, ionic strength and incidence of mismatched base pairs. A complement sequence can also be an RNA sequence complementary to the DNA sequence or its complement sequence, and can also be a cDNA.

As used herein, the term "substantially complementary" means that two sequences hybridize under stringent hybridization conditions. The skilled artisan will understand that substantially complementary sequences need not hybridize along their entire length. In particular, substantially complementary sequences may comprise a contiguous sequence of bases that do not hybridize to a target sequence, positioned 3' or 5' to a contiguous sequence of bases that hybridize under stringent hybridization conditions to a target sequence.

As used herein, a "control" is an alternative sample used in an experiment for comparison purpose. A control can be "positive" or "negative." A "control nucleic acid sample" or "reference nucleic acid sample" as used herein, refers to nucleic acid molecules from a control or reference sample. In certain embodiments, the reference or control nucleic acid sample is a wild type or a non-mutated DNA or RNA sequence. In certain embodiments, the reference nucleic acid sample is purified or isolated (e.g., it is removed from its natural state). In other embodiments, the reference nucleic acid sample is from a non-tumor sample, e.g., a blood control, a normal adjacent tumor (NAT), or any other non-cancerous sample from the same or a different subject.

As used herein, the term "detecting" refers to determining the presence of a mutation or alteration in a nucleic acid of interest in a sample. Detection does not require the method to provide 100% sensitivity.

As used herein, the term "effective amount" refers to a quantity sufficient to achieve a desired therapeutic and/or prophylactic effect, e.g., an amount which results in the prevention of, or a decrease in hereditary cancer, or one or more symptoms associated with hereditary cancer. In the context of therapeutic or prophylactic applications, the amount of a therapeutic agent administered to the subject will depend on the type and severity of the disease and on the characteristics of the individual, such as general health, age, sex, body weight and tolerance to drugs. It will also depend on the degree, severity and type of disease. The skilled artisan will be able to determine appropriate dosages depending on these and other factors. As used herein, a "therapeutically effective amount" of a therapeutic drug or agent is meant levels in which the physiological effects of a hereditary cancer such as breast cancer, ovarian cancer, colon cancer, or skin cancer are, at a minimum, ameliorated. A therapeutically effective amount can be given in one or more administrations.

As used herein, the terms "extraction" or "isolation" refer to any action taken to separate nucleic acids from other cellular material present in the sample. The term extraction or isolation includes mechanical or chemical lysis, addition of detergent or protease, or precipitation and removal of other cellular material.

As used herein, the term "gene" refers to a DNA sequence that comprises regulatory and coding sequences necessary for the production of an RNA, which may have a non-coding function (e.g., a ribosomal or transfer RNA) or which may include a polypeptide or a polypeptide precursor. The RNA or polypeptide may be encoded by a full length coding sequence or by any portion of the coding sequence so long as the desired activity or function is retained. Although a sequence of the nucleic acids may be shown in the form of DNA, a person of ordinary skill in the art recognizes that the corresponding RNA sequence will have a similar sequence with the thymine being replaced by uracil, i.e., "T" is replaced with "U."

As used herein, the term "genotype" refers to the genetic makeup of an individual cell, cell culture, tissue, organism (e.g., a human), or group of organisms.

As used herein, the term "homologous" or "homologue" or "ortholog" is known in the art and refers to related sequences that share a common ancestor or family member and are determined based on the degree of sequence identity. The terms "homology," "homologous," "substantially similar" and "corresponding substantially" are used interchangeably herein. They refer to nucleic acid fragments wherein changes in one or more nucleotide bases do not affect the ability of the nucleic acid fragment to mediate gene expression or produce a certain phenotype. These terms also refer to modifications of the nucleic acid fragments of the instant disclosure such as deletion or insertion of one or more nucleotides that do not substantially alter the functional properties of the resulting nucleic acid fragment relative to the initial, unmodified fragment. It is therefore understood, as those skilled in the art will appreciate, that the disclosure encompasses more than the specific exemplary sequences. These terms describe the relationship between a gene found in one individual, species, subspecies, variety, cultivar or strain and the corresponding or equivalent gene in another individual, species, subspecies, variety, cultivar or strain. For purposes of this disclosure homologous sequences are compared. "Homologous sequences" or "homologues" or "orthologs" are thought, believed, or known to be functionally related. A functional relationship may be indicated in any one of a number of ways, including, but not limited to: (a) degree of sequence identity and/or (b) the same or similar biological function. Preferably, both (a) and (b) are indicated. Homology can be determined using software programs readily available in the art, such as those discussed in Current Protocols in Molecular Biology (F. M. Ausubel et al., eds., 1987) Supplement 30, section 7.718, Table 7.71. Some alignment programs are MacVector (Oxford Molecular Ltd, Oxford, U.K.), ALIGN Plus (Scientific and Educational Software, Pennsylvania) and AlignX (Vector NTI, Invitrogen, Carlsbad, Calif.). Another alignment program is Sequencher (Gene Codes, Ann Arbor, Mich.), using default parameters.

As used herein, the term "hybridize" refers to a process where two substantially complementary nucleic acid strands (at least about 65% complementary over a stretch of at least 14 to 25 nucleotides, at least about 75%, or at least about 90% complementary) anneal to each other under appropriately stringent conditions to form a duplex or heteroduplex through formation of hydrogen bonds between complementary base pairs. Hybridizations are typically and preferably conducted with probe-length nucleic acid molecules, preferably 15-100 nucleotides in length, more preferably 18-50 nucleotides in length. Nucleic acid hybridization techniques are well known in the art. See, e.g., Sambrook, et al., 1989, *Molecular Cloning: A Laboratory Manual*, Second Edition, Cold Spring Harbor Press, Plainview, N.Y. Hybridization and the strength of hybridization (i.e., the strength of the association between the nucleic acids) is influenced by such factors as the degree of complementarity between the nucleic acids, stringency of the conditions involved, and the thermal melting point (Tm) of the formed hybrid. Those skilled in the art understand how to estimate and adjust the stringency of hybridization conditions such that sequences having at least a desired level of complementarity will stably hybridize, while those having lower complementarity will not. For examples of hybridization conditions and parameters, see, e.g., Sambrook, et al., 1989, *Molecular Cloning: A Laboratory Manual*, Second Edition, Cold Spring Harbor Press, Plainview, N.Y.; Ausubel, F. M. et al. 1994, *Current Protocols in Molecular Biology*, John Wiley & Sons, Secaucus, N.J. In some embodiments, specific hybridization occurs under stringent hybridization conditions. An oligonucleotide or polynucleotide (e.g., a probe or a primer) that is specific for a target nucleic acid will "hybridize" to the target nucleic acid under suitable conditions.

As used herein, the terms "individual", "patient", or "subject" can be an individual organism, a vertebrate, a mammal, or a human. In a preferred embodiment, the individual, patient or subject is a human.

As used herein, the term "library" refers to a collection of nucleic acid sequences, e.g., a collection of nucleic acids derived from whole genomic, subgenomic fragments, cDNA, cDNA fragments, RNA, RNA fragments, or a combination thereof. In one embodiment, a portion or all of the library nucleic acid sequences comprises an adapter sequence. The adapter sequence can be located at one or both ends. The adapter sequence can be useful, e.g., for a sequencing method (e.g., an NGS method), for amplification, for reverse transcription, or for cloning into a vector.

In some aspects, the library comprises a collection of nucleic acid sequences, e.g., a target nucleic acid sequence (e.g., a tumor nucleic acid sequence), a reference nucleic acid sequence, or a combination thereof). In some embodiments, the nucleic acid sequences of the library can be derived from a single subject. In other aspects, a library can comprise nucleic acid sequences from more than one subject (e.g., 2, 3, 4, 5, 6, 7, 8, 9, 10, 20, 30 or more subjects). In some aspects, two or more libraries from different subjects can be combined to form a library having nucleic acid sequences from more than one subject. In one aspect, the subject is human having, or at risk of having, a hereditary cancer.

As used herein, a "library nucleic acid sequence" refers to a nucleic acid molecule, e.g., a DNA, RNA, or a combination thereof, that is a member of a library. Typically, a library nucleic acid sequence is a DNA molecule, e.g., genomic DNA or cDNA. In some embodiments, a library nucleic acid sequence is fragmented, e.g., sheared or enzymatically prepared, genomic DNA. In certain embodiments, the library nucleic acid sequences comprise sequence from a subject and sequence not derived from the subject, e.g., adapter sequence, a primer sequence, or other sequences that allow for identification, e.g., "barcode" sequences.

As used herein, the term "limit of detection" or "LOD" is the point at which the measured value is larger than the uncertainty associated with it. The LOD is the point at which a value is beyond the uncertainty associated with its measurement and is defined as three times the relative standard deviation (RSD) of the mean at the zero concentration.

As used herein, the term "lower limit of quantification", "lower limit of quantitation" or "LLOQ" refers to the point where measurements become quantitatively meaningful. The analyte, or other measurable substance, response at this LOQ is identifiable, discrete and reproducible with a relative standard deviation (RSD %) of less than 20% and an accuracy of 85% to 115%.

As used herein, "next generation sequencing or NGS" refers to any sequencing method that determines the nucleotide sequence of either individual nucleic acid molecules (e.g., in single molecule sequencing) or clonally expanded proxies for individual nucleic acid molecules in a high throughput parallel fashion (e.g., greater than $10^3$, $10^4$, $10^5$ or more molecules are sequenced simultaneously). In one embodiment, the relative abundance of the nucleic acid species in the library can be estimated by counting the relative number of occurrences of their cognate sequences in the data generated by the sequencing experiment. Next generation sequencing methods are known in the art, and are described, e.g., in Metzker, M. *Nature Biotechnology Reviews* 11:31-46 (2010).

As used herein, the term "nucleic acid" refers to a polymeric form of nucleotides of any length, either ribonucleotides or deoxyribonucleotides, or analogs thereof. This term refers to the primary structure of the molecule, and thus includes double- and single-stranded DNA, as well as double- and single-stranded RNA. It also includes modified nucleic acids such as methylated and/or capped nucleic acids, nucleic acids containing modified bases, backbone modifications, and the like. The terms "nucleic acid" and "nucleotide sequence" are used interchangeably.

As used herein, "oligonucleotide" refers to a molecule that has a sequence of nucleic acid bases on a backbone comprised mainly of identical monomer units at defined intervals. The bases are arranged on the backbone in such a way that they can bind with a nucleic acid having a sequence of bases that are complementary to the bases of the oligonucleotide. The most common oligonucleotides have a backbone of sugar phosphate units. A distinction may be made between oligodeoxyribonucleotides that do not have a hydroxyl group at the 2' position and oligoribonucleotides that have a hydroxyl group at the 2' position. Oligonucleotides may also include derivatives, in which the hydrogen of the hydroxyl group is replaced with organic groups, e.g., an allyl group. Oligonucleotides that function as primers or probes are generally at least about 10-15 nucleotides in length or up to about 70, 100, 110, 150 or 200 nucleotides in length, and more preferably at least about 15 to 25 nucleotides in length, although shorter or longer oligonucleotides may be used in the method. The exact size will depend on many factors, which in turn depend on the ultimate function or use of the oligonucleotide. The oligonucleotide may be generated in any manner, including, for example, chemical synthesis, DNA replication, restriction endonuclease digestion of plasmids or phage DNA, reverse transcription, PCR, or a combination thereof. The oligonucleotide may be modified e.g., by addition of a methyl group, a biotin or digoxigenin moiety, a fluorescent tag or by using radioactive nucleotides.

Oligonucleotides used as primers or probes for specifically amplifying or specifically detecting a particular target nucleic acid generally are capable of specifically hybridizing to the target nucleic acid.

As used herein, the term "phenotype" refers to the observable characteristics of an individual cell, cell culture, organism (e.g., a human), or group of organisms which results from the interaction between that individual's genetic makeup (i.e., genotype) and the environment.

As used herein, the term "primer" refers to an oligonucleotide, which is capable of acting as a point of initiation of nucleic acid sequence synthesis when placed under conditions in which synthesis of a primer extension product which is complementary to a target nucleic acid strand is induced, i.e., in the presence of different nucleotide triphosphates and a polymerase in an appropriate buffer ("buffer" includes pH, ionic strength, cofactors etc.) and at a suitable temperature. One or more of the nucleotides of the primer can be modified for instance by addition of a methyl group, a biotin or digoxigenin moiety, a fluorescent tag or by using radioactive nucleotides. A primer sequence need not reflect the exact sequence of the template. For example, a non-complementary nucleotide fragment may be attached to the 5' end of the primer, with the remainder of the primer sequence being substantially complementary to the strand. The term primer as used herein includes all forms of primers that may be synthesized including peptide nucleic acid primers, locked nucleic acid primers, phosphorothioate modified primers, labeled primers, and the like. The term "forward primer" as used herein means a primer that anneals to the anti-sense strand of double-stranded DNA (dsDNA). A "reverse primer" anneals to the sense-strand of dsDNA.

In some aspects, primers are at least 10, 15, 18, or 30 nucleotides in length or up to about 100, 110, 125, or 200 nucleotides in length. In some aspects, primers are preferably between about 15 to about 60 nucleotides in length, and most preferably between about 25 to about 40 nucleotides in length. In some aspects, primers are 15 to 35 nucleotides in length. There is no standard length for optimal hybridization or polymerase chain reaction amplification. An optimal length for a particular primer application may be readily determined in the manner described in H. Erlich, *PCR Technology*, PRINCIPLES AND APPLICATION FOR DNA AMPLIFICATION, (1989).

As used herein, the term "primer pair" refers to a forward and reverse primer pair (i.e., a left and right primer pair) that can be used together to amplify a given region of a nucleic acid of interest.

As used herein, the term "probe" refers to a nucleic acid sequences that interacts with a target nucleic acids via hybridization. A probe may be fully complementary to a target nucleic acid sequence or partially complementary. The level of complementarity will depend on many factors based, in general, on the function of the probe. Probes can be labeled or unlabeled, or modified in any of a number of ways well known in the art. A probe may specifically hybridize to a target nucleic acid. Probes may be DNA, RNA or a RNA/DNA hybrid. Probes may be oligonucleotides, artificial chromosomes, fragmented artificial chromosome, genomic nucleic acid, fragmented genomic nucleic acid, RNA, recombinant nucleic acid, fragmented recombinant nucleic acid, peptide nucleic acid (PNA), locked nucleic acid, oligomer of cyclic heterocycles, or conjugates of nucleic acid. Probes may comprise modified nucleobases, modified sugar moieties, and modified internucleotide linkages. Probes are typically at least about 10, 15, 20, 25, 30, 35, 40, 50, 60, 75, 100 nucleotides or more in length.

As used herein, the term "sample" refers to clinical samples obtained from a patient. In preferred embodiments, a sample is obtained from a biological source (i.e., a "biological sample"), such as tissue or bodily fluid collected from a subject. Sample sources include, but are not limited to, mucus, sputum (processed or unprocessed), bronchial alveolar lavage (BAL), bronchial wash (BW), blood, bodily fluids, cerebrospinal fluid (CSF), urine, plasma, serum, or tissue (e.g., biopsy material). Preferred sample sources include plasma, serum, or whole blood.

As used herein, the term "sensitivity," in reference to the methods of the present technology, is a measure of the ability of a method to detect a preselected sequence variant in a heterogeneous population of sequences. A method has a sensitivity of S % for variants of F if, given a sample in which the preselected sequence variant is present as at least F % of the sequences in the sample, the method can detect the preselected sequence at a preselected confidence of C %, S % of the time. By way of example, a method has a sensitivity of 90% for variants of 5% if, given a sample in which the preselected variant sequence is present as at least 5% of the sequences in the sample, the method can detect the preselected sequence at a preselected confidence of 99%, 9 out of 10 times (F=5%; C=99%; S=90%). Exemplary sensitivities include at least 50, 60, 70, 80, 90, 95, 98, and 99%.

As used herein, the term "specific" in reference to an oligonucleotide primer means that the nucleotide sequence of the primer has at least 12 bases of sequence identity with a portion of the nucleic acid to be amplified when the oligonucleotide and the nucleic acid are aligned. An oligonucleotide primer that is specific for a nucleic acid is one that, under the stringent hybridization or washing conditions, is capable of hybridizing to the target of interest and not substantially hybridizing to nucleic acids which are not of interest. Higher levels of sequence identity are preferred and include at least 75%, at least 80%, at least 85%, at least 90%, at least 85-95% and more preferably at least 98% sequence identity. Sequence identity can be determined using a commercially available computer program with a default setting that employs algorithms well known in the art. As used herein, sequences that have "high sequence identity" have identical nucleotides at least at about 50% of aligned nucleotide positions, preferably at least at about 60% of aligned nucleotide positions, and more preferably at least at about 75% of aligned nucleotide positions.

As used herein, the term "specificity" is a measure of the ability of a method to distinguish a truly occurring preselected sequence variant from sequencing artifacts or other closely related sequences. It is the ability to avoid false positive detections. False positive detections can arise from errors introduced into the sequence of interest during sample preparation, sequencing error, or inadvertent sequencing of closely related sequences like pseudo-genes or members of a gene family. A method has a specificity of X % if, when applied to a sample set of $N_{Total}$ sequences, in which $X_{True}$ sequences are truly variant and $X_{Not\ true}$ are not truly variant, the method selects at least X % of the not truly variant as not variant. E.g., a method has a specificity of 90% if, when applied to a sample set of 1,000 sequences, in which 500 sequences are truly variant and 500 are not truly variant, the method selects 90% of the 500 not truly variant sequences as not variant. Exemplary specificities include at least 50, 60, 70, 80, 90, 95, 98, and 99%.

As used herein, the term "stringent hybridization conditions" refers to hybridization conditions at least as stringent as the following: hybridization in 50% formamide, 5×SSC, 50 mM $NaH_2PO4$, pH 6.8, 0.5% SDS, 0.1 mg/mL sonicated salmon sperm DNA, and 5× Denhart's solution at 42° C. overnight; washing with 2×SSC, 0.1% SDS at 45° C.; and washing with 0.2×SSC, 0.1% SDS at 45° C. In another example, stringent hybridization conditions should not allow for hybridization of two nucleic acids which differ over a stretch of 20 contiguous nucleotides by more than two bases.

As used herein, the terms "target nucleic acid" or "target sequence" as used herein refer to a nucleic acid sequence of interest to be detected and/or quantified in the sample to be analyzed. Target nucleic acid may be composed of segments of a chromosome, a complete gene with or without intergenic sequence, segments or portions of a gene with or without intergenic sequence, or sequence of nucleic acids which probes or primers are designed. Target nucleic acids may include a wild-type sequence(s), a mutation, deletion, insertion or duplication, tandem repeat elements, a gene of interest, a region of a gene of interest or any upstream or downstream region thereof. Target nucleic acids may represent alternative sequences or alleles of a particular gene. Target nucleic acids may be derived from genomic DNA, cDNA, or RNA.

As used herein, the terms "treat," "treating" or "treatment" refer, to an action to obtain a beneficial or desired clinical result including, but not limited to, alleviation or amelioration of one or more signs or symptoms of a disease or condition (e.g., regression, partial or complete), diminishing the extent of disease, stability (i.e., not worsening, achieving stable disease) state of disease, amelioration or palliation of the disease state, diminishing rate of or time to progression, and remission (whether partial or total).

The present technology is not to be limited in terms of the particular aspects described in this application, which are intended as single illustrations of individual aspects of the present technology. Many modifications and variations of this present technology can be made without departing from its spirit and scope, as will be apparent to those skilled in the art. Functionally equivalent methods and apparatuses within the scope of the present technology, in addition to those enumerated herein, will be apparent to those skilled in the art from the foregoing descriptions. Such modifications and variations are intended to fall within the scope of the present technology. It is to be understood that this present technology is not limited to particular methods, reagents, compounds compositions or biological systems, which can, of course, vary. It is also to be understood that the terminology used herein is for the purpose of describing particular embodiments only, and is not intended to be limiting.

In some aspects, the disclosure is drawn a multigene inherited cancer predisposition panel utilized for identifying heredity cancer susceptibility in an individual. In some aspects, multigene refers to, within the context of the panel, a screen for at least two genes of interest.

In some aspects, the multigene refers to within the context of the panel, a screen for at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, at least 25, at least 26, at least 27, at least 28, at least 29, at least 30, at least 31, at least 32, at least 33, or at least 34 genes of interest.

In some aspects, the multigene refers to within the context of the panel, a screen for at least about 3, at least about 4, at least about 5, at least about 6, at least about 7, at least about 8, at least about 9, at least about 10, at least about 11, at least about 12, at least about 13, at least about 14, at least about 15, at least about 16, at least about 17, at least about 18, at least about 19, at least about 20, at least about 21, at least about 22, at least about 23, at least about 24, at least about 25, at least about 26, at least about 27, at least about 28, at least about 29, at least about 30, at least about 31, at least about 32, at least about 33, or at least about 34 genes of interest.

In some aspects, the multigene inherited cancer predisposition panel utilizes at least two genes selected from the following: APC, ATM BARD1, BMPR1A, BRCA1, BRCA2, BRIP1, CDH1, CDK4, CDKN2A, CHEK2, EPCAM, MEN1, MLH1, MSH2, MSH6, MUTYH, NBN, NF1, PALB2, PMS2, POLD1, POLE, PTEN, RAD51C, RAD51D, RET, SDHB, SDHC, SDHD, SMAD4, STK11, TP53. In some aspects, the multigene inherited cancer predisposition panel utilizes the following 34 genes: APC, ATM BARD1, BMPR1A, BRCA1, BRCA2, BRIP1, CDH1, CDK4, CDKN2A, CHEK2, EPCAM, MEN1, MLH1, MSH2, MSH6, MUTYH, NBN, NF1, PALB2, PMS2, POLD1, POLE, PTEN, RAD51C, RAD51D, RET, SDHB, SDHC, SDHD, SMAD4, STK11, TP53.

In some aspects, the multigene inherited cancer predisposition panel utilizes at least two genes represented by the transcript IDs provided in Table 1. In some aspects, the multigene inherited cancer predisposition panel utilizes the 34 genes represented by the transcript IDs provided in Table 1.

In some aspects, the multigene inherited cancer predisposition panel is capable of detecting one or more variants of the genes provided in Table 1. In some aspects, the multigene inherited cancer predisposition panel is capable of detecting one or more of the gene variants provided in Table 2.

In some aspects, the multigene inherited cancer predisposition panel is a 34-gene cancer predisposition panel.

In some aspects, the disclosure is generally drawn to a method for detecting at least one mutation in a plurality of hereditary cancer-related genes in a biological sample, the method comprising: (a) extracting genomic DNA from a biological sample obtained from a patient, (b) generating a library comprising a plurality of bait-captured gene sequences corresponding to each of the plurality of hereditary cancer-related genes from the genomic DNA extracted in (a), the plurality of hereditary cancer-related genes comprising APC, ATM, BARD1, BMPR1A, BRCA1, BRCA2, BRIP1, CDH1, CDK4, CDKN2A, EPCAM, MEN1, MLH1, MSH2, MSH6, MUTYH, NBN, NF1, PALB2, POLD1, POLE, PTEN, RAD51C, RAD51D, RET, SDHB, SDHC, SDHD, SMAD4, STK11, and TP53; and (c) detecting at least one mutation in at least one of the plurality of bait-captured gene sequences using high throughput massive parallel sequencing.

In some embodiments, the biological sample is plasma, serum, or whole blood. In one embodiment, the biological sample is a dried human biological sample. In some embodiments, detecting at least one mutation in at least one of the plurality of bait-captured gene sequences indicates an increased susceptibility to hereditary cancer in the patient. In certain embodiments, the increased susceptibility to hereditary cancer is an increase of at least 0.5%, 1%, 5%, 10%, 15%, 20%, 25%, 30%, 35%, 40%, 45%, 50%, 55%, 60%, 65%, 70%, 75%, 80%, 85%, 90%, or 95%.

Additionally or alternatively, in some embodiments, one or both ends of the plurality of bait-captured gene sequences comprise an adapter sequence. In other embodiments, a subset of the plurality of bait-captured gene sequences comprise an adapter sequence at one or both ends. Examples of adapter sequences include P5 adapters, P7 adapters, P1 adapters, A adapters, or Ion Xpress™ barcode adapters.

In certain embodiments, the high throughput massive parallel sequencing is performed using pyrosequencing, reversible dye-terminator sequencing, SOLiD sequencing, Ion semiconductor sequencing, Helioscope single molecule sequencing, sequencing by synthesis, sequencing by ligation, or SMRT™ sequencing.

In some embodiments, the method further comprises amplifying exons 11 to 15 of PMS2 using long-range PCR to generate a plurality of PMS2 amplicons and detecting at least one mutation in at least one of the plurality of PMS2 amplicons using high throughput massive parallel sequencing. The plurality of PMS2 amplicons may or may not include an adaptor sequence. Additionally or alternatively, in some embodiments, the method further comprises amplifying exons 11 to 15 of CHEK2 using long-range PCR to generate a plurality of CHEK2 amplicons and detecting at least one mutation in at least one of the plurality of CHEK2 amplicons using high throughput massive parallel sequencing. The plurality of CHEK2 amplicons may or may not include an adaptor sequence.

In certain embodiments, exons 11 to 15 of CHEK2 are amplified using a forward primer comprising the sequence of SEQ ID NO:1 and a reverse primer comprising the sequence of SEQ ID NO:2 to generate the CHEK2 amplicons. In certain embodiments, exons 11 to 15 of PMS2 are amplified using a forward primer comprising the sequence of SEQ ID NO:3 and a reverse primer comprising the sequence of SEQ ID NO:4 to generate the PMS2 amplicons.

In some embodiments, the specificity of detecting at least one mutation in PMS2 and CHEK2 is increased relative to a method that does not perform long-range PCR of exons 11-15 of PMS2 and CHEK2 prior to performing high throughput massive parallel sequencing. In some embodiments, the increased specificity is an increase of at least 0.5%, 1%, 5%, 10%, 15%, 20%, 25%, 30%, 35%, 40%, 45%, 50%, 55%, 60%, 65%, 70%, 75%, 80%, 85%, 90%, or 95% relative to a corresponding control.

In certain embodiments, the detection interference from pseudogenes is decreased relative to a method that does not perform long-range PCR of exons 11-15 of PMS2 and CHEK2 prior to performing high throughput massive parallel sequencing. In some aspects, the decreased detection interference is a decrease of at least 0.5%, 1%, 5%, 10%, 15%, 20%, 25%, 30%, 35%, 40%, 45%, 50%, 55%, 60%, 65%, 70%, 75%, 80%, 85%, 90%, or 95% relative to a corresponding control.

In one aspect, the primers of the present disclosure are selected from among SEQ ID NO:1, SEQ ID NO:2, SEQ ID NO:3, and SEQ ID NO:4. In one aspect, the primers of the present disclosure are selected from nucleotide sequences that share at least 90%, 91%, 92%, 93%, 94%, 95%, 96%, 97%, 98%, or 99% with any one of SEQ ID Nos: 1, 2, 3, or 4.

In one aspect, a primer of the present disclosure is selected from a nucleotide sequence comprising a modified SEQ ID NO:1, wherein a terminator codon occurs between nucleotides 25 and 26 of SEQ ID NO:1. In one aspect, the terminator codon is selected from TAA, TAG, and TGA.

In one aspect, a primer of the present disclosure is selected from a nucleotide sequence comprising a modified SEQ ID NO:1, wherein one or more nucleotides occurs between nucleotides 25 and 26 of SEQ ID NO:1. In one aspect, the one or more nucleotides that occur between nucleotides 25 and 26 of SEQ ID NO:1 are selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 nucleotides.

In some aspects, kits for use in practicing the methods described herein are contemplated. In some aspects, kits comprise the multigene inherited cancer predisposition panel and all solutions, buffers, and vessels sufficient for performing the methods described herein.

EXAMPLES

Example 1

Gene Selection and DNA Specimens

Thirty-four genes were selected an inherited cancer predisposition panel, and these thirty-four genes are associated with well characterized cancer syndromes, along with more recently discovered genes associated with increased cancer risk (Table 1). The genes selected increase the lifetime risk of cancer of the breast, ovary, colon, rectum, endometrium, pancreas, prostate, neuroendocrine system, and/or other cancer types. Genes were selected that conferred at least a≥2-fold increased risk for cancer or a 5% lifetime risk. Additionally, at the time of test development, genetic testing and/or medical management guidelines existed for many of the individual genes on the panel (18; 24-26; 28). Common polymorphisms contribution to a polygenic risk score were excluded from this panel design.

TABLE 1

Genes included in the 34-gene inherited cancer predisposition panel

| Gene Name | Transcript ID |
|---|---|
| APC | NM_000038.5 |
| ATM | NM_000051.3 |
| BARD1 | NM_000465.3 |
| BMPR1A | NM_004329.2 |
| BRCA1 | NM_007294.3 |
| BRCA2 | NM_000059.3 |
| BRIP1 | NM_032043.2 |
| CDH1 | NM_004360.3 |
| CDK4 | NM_000075.3 |
| CDKN2A | NM_000077.4 |
|  | NM_058195.3 |

TABLE 1-continued

Genes included in the 34-gene inherited cancer predisposition panel

| Gene Name | Transcript ID |
| --- | --- |
| CHEK2 | NM_007194.3 |
| EPCAM | NM_002354.2 |
| MEN1 | NM_130799.2 |
| MLH1 | NM_000249.3 |
| MSH2 | NM_000251.2 |
| MSH6 | NM_000179.2 |
| MUTYH | NM_001128425.1 |
| NBN | NM_002485.4 |
| NF1 | NM_000267.3 |
| PALB2 | NM_024675.3 |
| PMS2 | NM_000535.5 |
| POLD1 | NM_002691.3 |
| POLE | NM_006231.3 |
| PTEN | NM_000314.4 |
| RAD51C | NM_058216.2 |
| RAD51D | NM_002878.3 |
| RET | NM_020975.4 |
| SDHB | NM_003000.2 |
| SDHC | NM_003001.3 |
| SDHD | NM_003002.3 |
| SMAD4 | NM_005359.5 |
| STK11 | NM_000455.4 |
| TP53 | NM_000546.5 |
| VHL | NM_000551.3 |

For validation of the 34-gene hereditary cancer predisposition panel, 131 de-identified residual whole blood patient specimens submitted for routine clinical testing were used. In addition, a specimen positive for a 40-base deletion in BRCA1 (GM14094) and the well-characterized NA12878 DNA specimen were tested (Coriell Mutant Cell Repository, Camden, NJ).

To assess variant detection yield of the 34-gene panel in practice, finders were analyzed from the first 500 clinical specimens submitted for testing with this assay. For each patient, informed consent for genetic analysis was obtained. Patient results were de-identified before analysis.

Next Generation Sequencing, Bioinformatics Processing, and Copy Number Variant Analysis Genomic DNA from whole blood or cultured cells was isolated using the Roche Magnapure system (Roche Molecular Systems, Indianapolis, IN). Isolated genomic DNA was mechanically sheared to an average size of 250 bases using a Covaris instrument LE220 (Covaris Inc., Woburn, MA). The fragmented DNA was enzymatically repaired and end-modified with adenosine (NEBNext Ultra DNA Library prep kit, NEB, Ipswich, MA) to make it receptive to T/A ligation with barcoded adapters (Integrated DNA Technologies, Coral, IL). The ligated products were size-selected (AMPure Beads, Agencourt, Beverley, MA) and amplified (GeneRead DNA I Amp Kit, Qiagen, Mississauga, ON) and then the regions of interest were captured using biotinylated RNA baits (SureSelect, Agilent, Mississauga, ON). The baits were designed to capture all coding exons and exon/intron boundaries of the 34 hereditary cancer related genes (Table 1). In addition, any noncoding regions of these genes containing currently known pathogenic variants, as well as the promoter regions of APC, MLH1, MSH2 and PTEN were included. The DNA/RNA hybrids were enriched with streptavidin attached magnet beads (Dynabeads MyONe Streptavidin T1, Thermo Fisher Scientific, Markham, ON) and subjected to washing under increasing stringency in order to remove non-targeted DNA sequences. A second amplification was performed (Herculase® II Fusion DNA Polymerase, Agilent, Mississauga, ON), followed by bead purification (AMPure Beads, Agencourt, Beverley, MA) to remove all unused primers and nucleotides.

To achieve assay specificity by avoiding interference from pseudogenes, exons 11-15 from PMS2 and CHEK2 were amplified from genomic DNA by long-range PCR (LR-PCR, Takara LA Taq DNA polymerase, Takara Bio, Mountain View, CA). LR-PCR products were subjected to mechanical shearing using a Covaris E220 instrument, enzymatic end repair, and 3' adenylation, followed by ligation to barcoded adaptors and a second PCR to enrich ligated fragments as described above. Final products from the LR-PCR library and the captured gDNA library were combined and sequenced on an Illumina NextSeq instrument, 2×150 cycles (NextSeq500 mid output v2 kit, Illumina, San Diego, CA).

Following the sequencing reaction, sequence alignment and allele assignment were performed. BCL files from NextSeq500 were converted to FASTQ files. The raw sequence reads in FASTQ files were then aligned to the Genome Reference Consortium human genome build 37(GRCh37), or custom reference genome, using the Burrows-Wheeler Aligner (BWA). The custom reference genome differs from GRCh37 in that highly homologous pseudogene sequences within chr22:16,983,750-16,990,200 and chr7:6,776,750-6,791,250 were replaced with nucleotide T for accurate alignment of LR-PCR library to the PMS2 and CHEK2 gene regions. Mapped reads were filtered by Phred Quality score of read mapping over 30 (>99.9% accuracy), before downstream analysis. Reads were then sorted and indexed using SAMtools, followed by removal of read duplications using Picard Tools. Local realignment and base-quality score recalibration were performed using the Genome Analysis Toolkit (GATK). Average and minimum depth of coverage for every region of interest (ROI) were computed, and variant calling was performed using GATK Unified Genotyper and Haplotyper. A single variant call file (vcf) was created by merging variant call files from both variant callers. Coverage and variant-depth reports were created and loaded to the sequencing database (seqDB). Alamut Batch was used to obtain high-level annotation for detected variants. For EPCAM, only copy number variant analysis was performed. Each targeted base within the ROI (115,483 bp) was required to have at least 20× unique reads.

CNV-positive specimens were identified using a CNV flagging algorithm developed in-house based on the well-established NGS read-depth (RD) approach 29-31. To calculate the read-depth, we partitioned large targets into nonoverlapping bins of approximately 200 bp and used the average read-depth of each bin. To enhance large CNV signals (e.g. BRCA1 exon 9-12 del, whole gene del/dup), we generated additional target groups by joining multiple bins within the target range. Each target group was considered independently. For CNV target flagging, a normalized target representation value X was calculated using the following steps: (a) target read-depth was divided by mean read-depth of all targets to give relative target read-depth, RDr; (b) principle component analysis (PCA) was performed on the RDr, generating the RDrp; (c) RDrp was further normalized by dividing the target RDrp by the median RDrp of all targets, yielding X. The Z score of each target was calculated from the following formula: $Z=(X-\mu)/\sigma$, where X is normalized RDrp, $\mu$ is the median X across specimens in a batch typically composed of 92 specimens, and $\sigma$ is the median absolute deviation of X from a training set of about 1,300 specimens. To augment the Z score, the Z.adj score was used; the Z.adj score was calculated by dividing the Z score by the standard deviation of Z score across targets, excluding the given target. This Z.adj extracts putative CNV signal from noisy read-depth to discern patterns of read depth biases. Finally, a CNV target was flagged if the target Z and/or Z.adj for a given target group were over the cut-off value created from a training set of approximately 8,000 specimens. PMS2 and CHEK2 exons 11-15 were excluded from copy number analysis.

Array Comparative Genomic Hybridization and Variant Assessment

An aCGH method was used to complement the NGS CNV flagging algorithm. All specimens flagged as having CNVs by NGS were reflexed to aCGH for CNV confirmation. Custom array probes for the 34 genes in the panel were designed using Agilent SureDesign custom design tool. Approximately 57,000 probes were designed, giving on average 26 probes per exon with less density for introns and promoters. Patient specimens and gender-matched reference specimens were labeled with Cy5 and Cy3, respectively, using Agilent SureTag Complete DNA Labeling Kit followed by column purification and volume reduction. The labeled DNA was then combined and hybridized onto a custom microarray slide (Agilent, Mississauga, ON). After hybridization, the slides were washed to remove non-specific binding and then immediately scanned on the Agilent SureScan or C scanner; data were extracted using Agilent CytoGenomics Software. The results were manually reviewed by licensed personnel and a licensed director for report generation.

All variants detected by the NGS panel were manually reviewed by licensed personnel and classified by a team of variant scientists as described previously (32), according to the ACMG guidelines (33). Classifications were scored as benign, likely benign, unknown significance (VUS), likely pathogenic, or pathogenic. This result was then reviewed by a licensed director for reporting. Variants identified through clinical testing at our laboratory are routinely submitted to ClinVar (34). The variant of uncertain significance rate for the first 500 clinical samples was calculated based on the percentage of patients tested with no pathogenic or likely pathogenic variants identified and 1 or more VUSs identified. For this study, variants are considered clinically actionable when classified as either pathogenic or likely pathogenic.

Assay Performance

The 133 unique specimens included in the assay validation study were sequenced for a total of 726 trials in 8 consecutive sequencing runs. Inventors aimed for a minimum unique sequencing coverage of 50× for 100% of our targeted region of interest. For routine analysis, coverage of 20× is required for all bases in the targeted region. In the validation runs, 99.8% of the targeted regions were covered 100×, with an average median coverage depth of 382× (range: 89-946). All target regions within coding exons were covered over 100×. Among the 726 tested specimens, 99.9% specimens passed coverage requirement of 20× with on average 380× median coverage depth (range: 112-689).

Technical Validation for SNVs, Indels, and CNVs

Sequencing variant detection accuracy was assessed using 15 specimens with collectively 56 known variants (28 unique) from bidirectional Sanger sequencing in at least one of the following genes: APC, MLH1, MSH2, MSH6, PMS2, and RET. The 28 unique variants included 23 SNVs and 5 deletions. In addition, a BRCA1 c.1175_1214del40 positive specimen GM14094 was tested. All expected 57 variants were accurately detected including the 40 bp deletion in BRCA1 (Table 2). Subsequently, a well-characterized HapMap reference specimen (NA12878) was investigated for the regions with a highly confident published consensus sequence overlapping with our ROI. Out of a total of 91,940 bp tested, all 45 known benign variants were detected, with no false-positive calls (data not shown). All specimens were replicated 9 times, except the BRCA1 c.1175_1214del40 positive control, which repeated 5 times. Collectively, the assay yielded 100% accuracy for detection of known sequencing variants.

TABLE 2

SNV and indel variants used for accuracy study

| Gene | Variant | No. specimen tested |
|---|---|---|
| APC | c.1458T > C (p.Tyr486Tyr) | 2 |
| APC | c.1635G > A (p.Ala545Ala) | 3 |
| APC | c.l958 + 8T > C (p.?) | 1 |
| APC | c.2547_2550del (p.Asp849Glufs*11) | 1 |
| APC | c.3468_3470del (p.Glu1157del) | 1 |
| APC | c.4398del (p.Pro 1467Leufs*6) | 1 |
| APC | c.4479G > A (p.Thr1493Thr) | 3 |
| APC | c.5034G > A (p.Gly1678Gly) | 3 |
| APC | c.5268T > G (p.Ser1756Ser) | 3 |
| APC | c.5465T > A (p.Val1822Asp) | 4 |
| APC | c.5880G > A (p.Pro1960Pro) | 3 |
| APC | c.6281del (p.Pro2094Leufs*18) | 1 |
| BRCA1 | c.1175_1214del40 (p.Leu392Glnfs) | 1 |
| MLH1 | c.293G > A (p.Gly98Asp) | 1 |
| MLH1 | c.655A > G (p.Ile219Val) | 1 |
| MSH2 | c.211 + 9C > G (p.?) | 1 |
| MSH2 | c.1847C > G (p.Pro616Arg) | 1 |
| MSH2 | c.2647del (p.Ile883Leufs*9) | 1 |
| MSH6 | c.116G > A (p.Gly39Glu) | 1 |
| MSH6 | c.2633T > C (p.Val878Ala) | 1 |
| PMS2 | c.2466T > C (p.Leu822Leu) | 1 |
| PMS2 | c.2007 − 4G > A (p.?) | 3 |
| PMS2 | c.1621A > G (p.Lys541Glu) | 4 |
| PMS2 | c.1408C > T (p.Pro470Ser) | 3 |
| PMS2 | c.780 > G (p.Ser260Ser) | 4 |
| RET | c.1826G > A (p.Cys609Tyr) | 1 |
| RET | c.1900T > C (p.Cys634Arg) | 1 |
| RET | c.2307G > T (p.Leu769Leu) | 5 |
| RET | c.2372A > T (p.Tyr791Phe) | 1 |

To test intra- and inter-assay reproducibility, a set of 30 specimens was analyzed, each in triplicate within a run and repeated three times, for a total of 9 replicates per specimen. The specimens selected for reproducibility studies comprised 15 specimens with known variants used in the accuracy study described above, NA12878, and 14 de-identified specimens with unknown genotype. In all, within reportable ROI, NGS detected 1,733 variants (228 unique) from the 30 specimens. These included 1,708 SNVs (216 unique) and 25 indels (12 unique). Of these, 1,418 variants (179 unique) were in coding exons and 315 variants (49 unique) were in non-exonic regions. It is important to note that there were 4 discordant positions in 115,487 sequenced bases among the 9 trials per specimen. Those positions were residing within homopolymeric regions which known to cause sequencing artefacts. As all discordant or inconsistent variant calls occurred in non-exonic regions with no known clinical significance, variants observed in those 4 positions were excluded from the reportable range. Within reportable ROI, there were 100% intra- and inter-assay variant call concordance from all 9 trials per specimen.

To validate the in-house developed CNV flagging algorithm, a set of 103 anonymized DNA specimens with known CNV status were tested for a total of 457 trials. These included 18 CNV positive specimens by either MLPA or aCGH (Table 3).

TABLE 3

CNV positive specimens included in validation study.

| Specimen Name | Gene | CNV variant | No. replication |
|---|---|---|---|
| S1 | CDH1 | exon 4-9 deletion | 3 |
| S2 | BRCA2 | whole gene duplication | 3 |
| S3 | BRCA1 | whole gene deletion | 3 |
| S4 | TP53 | whole gene deletion | 3 |
| S5 | BRCA1 | exon 16-17 deletion | 3 |
| S6 | BRCA1 | exon 1-2 duplication | 3 |
| S7 | BRCA1 | exon 9-12 deletion | 3 |
| S8 | BRCA1 | exon 21-23 deletion | 5 |
| S9 | BRCA1 | exon 13 duplication | 3 |
| S10 | BRCA1 | exon 9-12 deletion | 5 |
| S11 | MLH1 | exon 16-19 deletion | 1 |
| S12 | PMS2 | whole gene deletion* | 1 |
| S13 | MLH1 | exon 16-19 deletion | 1 |
| S14 | PMS2 | exon 8 deletion | 1 |
| S15 | CDH1 | whole gene duplication | 1 |
| S16 | BRCA1 | exon 1-22 duplication | 1 |
| S17 | PALB2 | exon 9-10 deletion | 1 |
| S18 | BRCA1 | exon 22 deletion | 1 |

*S12 PMS2 exon 11-15 CNV status was not tested by NGS.

Intra-assay precision studies included 2 CNV positive specimens (S8 and S10, Table 3), replicated 5 and 3 times, respectively, and a CNV negative specimen replicated 5 times. Each of the replicates gave concordant CNV call resulting in 100% intra-assay precision. Inter-assay precision studies included 94 de-identified specimens replicated 2 (n=1) or 3 times (n=93) for a total of 281 trials. Of these, 9 were known positives (Table 3). Including the 9 known CNV positive specimens, 90 specimens showed concordant CNV calls among replicates, yielding 95.7% (90/94) inter-assay precision. 4 specimens resulted in discordant calls in at least one of the replicates. All specimens flagged as having CNVs by NGS were reflexed to aCGH for CNV confirmation. All discordant specimens were CNV negative by aCGH. In combination with aCGH confirmation, the inter-assay precision was improved to 100%.

All 18 positive specimens were correctly called in a total of 42 trials, yielding 100% CNV detection sensitivity. Three of the 18 positives had a single-exon duplication or deletion, which is known to be challenging to detect by a targeted NGS assay. CNV detection specificity was evaluated from 457 trials of 103 unique specimens. There were 9 false positive calls from 6 unique specimens including the 4 specimens described in inter-assay precision study, resulting in 98.0% (448/457) assay specificity. In combination with aCGH confirmation, the CNV detection specificity was 100%.

Clinical Specimens

The validated 34-gene panel for variants associated with inherited cancer predisposition was applied to the molecular diagnosis of 500 consecutive, unique de-identified patient specimens. Based on the clinical information submitted, indications for testing included a personal and/or familial history of cancer—most frequently breast, ovarian, or colon. The assay detected a total of 51 pathogenic and 2 likely pathogenic variants in specimens from 49 (9.8%) of the 500 patients. For the first 500 specimens, the panel yielded at VUS rate of 36%.

The classification of each variant reflects the classification at the time of reporting. Among the 53 pathogenic/likely pathogenic variants detected, 48 were within exons (26 SNVs and 22 indels), 3 were in splice junctions (3 SNVs), and 2 were CNV variants (a BRCA1 exon 13 duplication, and a PMS2 deletion of exon 7 and 8). The relative distribution of the 53 pathogenic/likely pathogenic variants detected in this study is provided in Table 4. BRCA1/2 were the most frequently mutated genes, with 21 patients harboring 24 pathogenic variants. In addition, 3 patients had pathogenic variants in the Lynch syndrome-associated genes PMS2 (n=2) and MLH1 (n=1). The remaining 26 patients had pathogenic/likely pathogenic variants in 9 other genes: monoallelic MUTYH variants in 9 patients; CHEK2 variants in 8; ATM, CDH1, and PALB2 variants in 2 patients each, and BARD1, CDKN2A, RAD51C, and RET variants in 1 patient each. Notably, 4 patients had 2 pathogenic variants each: 3 had pathogenic variants in BRCA1/2, and 1 had pathogenic variants in BRCA2 and MUTYH.

TABLE 4

Pathogenic/likely pathogenic variants detecting the in the 500 consecutive specimens.

| Gene | No. Detected | % | Variant | Type | Classification | No. detected |
|---|---|---|---|---|---|---|
| BRCA1 | 12 | 23 | c.68_69del (p.Glu23Valfs*17) | DEL | P | 1 |
| | | | c.211A > G (p.Arg71Gly) | SNV | P | 1 |
| | | | c.406dupA (p.Arg136Lysfs*6) | INS | P | 1 |
| | | | c.427G > T (p.Glu143*) | SNV | P | 1 |
| | | | c.1960A > T (p.Lys654*) | SNV | P | 1 |
| | | | c.3193dup (p.Asp1065Glyfs*2) | INS | P | 1 |
| | | | c.4327C > T (p.Arg1443*) | SNV | P | 2 |
| | | | c.5266dup (p.Gln1756Profs*74) | INS | P | 1 |
| | | | c.5353C > T (p.Gln1785*) | SNV | P | 1 |
| | | | c.3598C > T (p.Gln1200*) | SNV | P | 1 |
| | | | Exon 13 Duplication | CNV | P | 1 |
| BRCA2 | 12 | 23 | c.755_758del (p.Asp252Valfs*24) | DEL | P | 1 |
| | | | c.1265del (p.Asn422Ilefs*8) | DEL | P | 1 |
| | | | c.3922G > T (p.Glu1308*) | SNV | P | 1 |
| | | | c.4284dup (p.Gln1429Serfs*9) | INS | P | 1 |
| | | | c.4631dup (p.Asn1544Lysfs*4) | INS | P | 1 |
| | | | c.5290_5291del (p.Ser1764Lysfs*3) | DEL | P | 1 |

TABLE 4-continued

Pathogenic/likely pathogenic variants detecting the in the 500 consecutive specimens.

| Gene | No. Detected | % | Variant | Type | Classification | No. detected |
|---|---|---|---|---|---|---|
| | | | c.5385dup (p.Asp1796Argfs*11) | INS | P | 1 |
| | | | c.5681dup (p.Tyr1894*) | INS | P | 1 |
| | | | c.5682C > G (p.Tyr1894*) | SNV | P | 1 |
| | | | c.5946del (p.Ser1982Argfs*22) | DEL | P | 2 |
| | | | c.6373dup (p.Thr2125Asnfs*4) | INS | P | 1 |
| MUTYH | 9 | 17 | c.536A > G (p.Tyr179Cys) | SNV | P | 1 |
| | | | c.1187G > A (p.Gly396Asp) | SNV | P | 6 |
| | | | c.1214C > T (p.Pro405Leu) | SNV | P | 1 |
| | | | c.1477G > T (p.Val493Phe) | SNV | P | 1 |
| CHEK2 | 8 | 15 | c.444 + 1G > A | SNV | P | 1 |
| | | | c.793 − 1G > A | SNV | P | 1 |
| | | | c.1100delC(p.Thr367Metfs*15) | DEL | P | 5 |
| | | | c.1169A > C (p.Tyr390Ser) | SNV | LP | 1 |
| ATM | 2 | 4 | c.7638_7646del (p.Arg2547_Ser2549del) | DEL | P | 1 |
| | | | c.8395_8404del (p.Phe2799Lysfs*4) | DEL | P | 1 |
| PALB2 | 2 | 4 | c.2642_2645dup (p.Cys882Trpfs*3) | INS | P | 1 |
| | | | c.3256C > T (p.Arg1086*) | SNV | P | 1 |
| PMS2 | 2 | 4 | c.809C > G (p.Ser270*) | SNV | P | 1 |
| | | | Exon 7-8 deletion | CNV | P | 1 |
| CDH1 | 1 | 2 | c.1565 + 1G > C | SNV | P | 1 |
| BARD | 1 | 2 | c.1690C > T (p.Gln564*) | SNV | P | 1 |
| CDKN2A | 1 | 2 | c.301G > T (p.Gly101Trp) (p16) | SNV | P | 1 |
| MLH1 | 1 | 2 | c.793C > T (p.Arg265Cys) | SNV | P | 1 |
| RAD51C | 1 | 2 | c.773G > A (p.Arg258His) | SNV | LP | 1 |
| RET | 1 | 2 | c.2410G > A (p.Val804Met) | SNV | P | 1 |
| Total | 53 | 100 | | | | 53 |

P = pathogenic;
LP = likely pathogenic.

Discussion and Analysis

Various targeted NGS-based multigene inherited cancer panels have been developed by clinical diagnostic laboratories (14, 18-22). As each laboratory-developed test uses different laboratory procedures and bioinformatics pipelines, rigorous laboratory validation is critical to ensure accurate and reliable results from NGS assays for use in clinical practice (35). In this study, we demonstrated that the 34-gene cancer predisposition panel achieved 100% analytical sensitivity and specificity for SNVs and small Indels. A well-known challenge for NGS is accurate variant calling in low-complexity and homopolymeric regions. From our inter- and intra-assay precision studies, we identified 4 different positions within homopolymeric context causing discordant variant calls and excluded from reportable range. While one of those positions resulted in 9 false variant calls (31% median variant frequency) out of 270 tested cases, the remaining three resulted in only 1 or 2 false calls (23% median variant frequency). This result suggests the importance of using multiple specimens for precision studies to define reportable range for an NGS assay. A pathogenic splice-site variant, MSH2 c.942+3A>T, is kwon to be difficult to detect due to the presence of an adjacent 27bp polyA sequence. By using a customized GATK UnifiedGenotyper setting to force calls at each site, we detected 20 cases of MSH2 c.942+3A>T from 51,129 clinical results of the 34-gene cancer predisposition panel. In comparison, 5 of these cases were not detected with the default UnifiedGenotyper setting. The presence of pseudogenes can also interfere with accurate variant calling. To avoid interference from pseudogenes, a CHEK2 and PMS2 exon 11-15 sequencing library was prepared from gene-specific long-range PCR fragments. Nonetheless, during development we found a false-negative NGS call for a Sanger sequencing-confirmed variant, c.2466 T>C (r510000, benign) in PMS2 exon 15. The correct call was made upon using the custom reference sequence, which differs from GRCh37 in that highly homozygous PMS2 pseudogene PMSCL sequences were replaced with nucleotide T to enhance alignment of the gene-specific PCR fragment sequence. Therefore, the characteristics of sequence context should be considered for developing an appropriate analysis pipeline.

In addition to SNVs and small indels, CNVs have been implicated as the cause of inherited cancer syndromes (36 and 37). However, accurate CNV detection in targeted NGS data remains challenging. Bias and noise in NGS coverage data, derived from various sources during library preparation, capture, and sequencing, distort the association between copy numbers and read coverages (38 and 39). Despite the excellent sensitivity and specificity of our CNV flagging algorithm, we observed that the algorithm needed to be supplemented by aCGH to achieve 100% specificity.

Soukupova et al reported that coverage uniformity is an important factor for reliable CNV detection (40). During assay development we performed multiple rounds of target capture RNA bait design and testing to enhance low-covered region, and observed improved coverage uniformity. Further optimization of NGS library preparation procedures, such as using normalized high-quality DNA for library preparation, may improve coverage uniformity and therefore CNV specificity. In addition, employing recently described denoising methods based on a signal processing technique may enhance the detection accuracy of our CNV algorithm (38). Another factor that may confound accurate CNV analysis is a processed pseudogene if its existence is unknown. The unique feature of processed pseudogenes, lacking promoter and intronic sequences, may cause false-positive exonic duplication calls. The presence of an SMAD4 processed pseudogene was first reported in 2015 in a subset of individuals, with a frequency of 0.26% (12/4,672 clinical cases) (41). A similar frequency (0.25%, 58/23,032 clinical cases, data not shown) was observed from our clinical results. Upon visual inspection using an Integrative Genomics Viewer (IGV), the discontinuous coverage depth pattern on exon/intron boundaries, unique to processed pseudogenes, was readily identified and aCGH confirmation gave a concordant result. In addition, no erroneous splice site variant call was made, and visual inspection with IGV confirmed retention of >98% reference sequence at each intronic position within our ROI.

Mutigene panel testing can be utilized to identify individuals who are at increased risk for hereditary cancer. Identification of an inherited risk factor allows patients options decreasing that risk, including increased surveillance, surgery, and/or chemoprevention (18 and 24-26). Targeted testing for at-risk family members can subsequently be performed. If positive, the family member can take steps to prevent cancer or aid in its early detection. Negative results can reassure the family member and prevent unnecessary surveillance or other preventive measures. For women with pathogenic/likely pathogenic variants in BRCA1/2, some risk-reducing strategies, such as prophylactic surgeries, have demonstrated reduced cancer risk and mortality in some studies (42-44), but not others (45). Risk-reducing surgery for individuals with BRCA1/2 variants and breast cancer has not yet demonstrated an overall survival benefit. Genetic information can also be used to select the patients most appropriate for targeted therapies. For example, women whose ovarian or breast cancer is associated with pathogenic variants in BRCA1/2 may be treated with poly (ADP-ribose) polymerase (PARP) inhibitors that have been approved for the management of advanced BRCA1/2 mutation-associated ovarian cancer (46-49).

Historically, testing for germline pathogenic or likely pathogenic variants has been performed sequentially through single-gene or single-syndrome testing. However, a mutigene panel approach has a number of advantages over the traditional sequential approach. Previous studies have concluded that mutigene panel testing compared with a single-gene testing can cost-effectively improve the identification of at-risk individuals for early health interventions and the outcome of cancer treatment (3 and 50).

Studies have highlighted that panel testing is able to uncover clinically actionable variants unrelated to the syndrome that the clinician initially suspected (51 and 52). Ricker et al. showed that 7.4% (35/475) of patients with deleterious mutations detected with a multigene panel would have had negative results with a gene-by-gene testing approach (21). Other studies using mutigene panels found that over 4% of women at risk for hereditary breast cancer had mutations in genes other than BRCA1/2, including PALB2, CHEK2, and ATM (53 and 54). In our cohort of 49 individuals who had at least one clinically actionable finding, 46 had provided enough clinical criteria to evaluate eligibility for genetic testing based on the National Comprehensive Cancer Network (NCCN) guidelines in effect at the time of testing. 41 met BRCA1/2, 2 met both BRCA1/2 and Lynch criteria, and 3 did not meet either criteria for testing, based on the information provided. Of the individuals that met NCCN criteria for BRCA1/2 testing, 22 (54%) had clinically actionable variants identified in genes other than BRCA1/2. Variants were identified in genes causative of hereditary breast cancer, such as ATM, BARD1, CDH1, CHEK2, and PALB2. Because these genes are not associated with a single-gene syndrome, they are not typically interrogated during sequential evaluation. Currently, there are medical management guidelines for these genes, except for BARD1 (25). However, variants were also identified in genes with no consensus link to hereditary breast cancer, such as MUTYH, PMS2, RAD51C, and RET. The individual found to have the pathogenic RET variant had no reported personal or family history indicative of any of the associated conditions. Interestingly, 8 MUTYH carriers were identified because they were sent for a breast/ovarian indication. In summary, pathogenic and likely pathogenic variants were identified in 8 genes that are not part of single syndrome testing for BRCA-related breast and ovarian cancer syndrome or Lynch syndrome.

Outside of identifying actionable variants in genes incidental to the initially suspected syndrome, previous studies have also established that the rate of families carrying more than one actionable variant is higher than what was initially thought when guidelines recommended cascade testing for only the known familial pathogenic/likely pathogenic variants (55-57). In our cohort of 49 individuals with actional findings, 5 had verified familial variants. If testing had been restricted to the known familial variants in these cases, the testing strategy would have failed to identify an actionable variant in one of these families, specifically a CHEK2 c.1100delC in a family with a known PMS2 variant. Additionally, of the 500 individuals tested, 4 were identified as having two pathogenic variants (0.8% of the overall cohort, 8% of those who had any actionable finding). Three individuals had a pathogenic variant in both BRCA1 and BRCA2, one of whom inherited both these mutations from a family member. One individual had a pathogenic variant in BRCA2 and in MUTYH. For this individual, the pathogenic variant in MUTYH would have been missed if testing had been restricted to a single gene/syndrome instead of pursuing panel testing. Currently, individuals with one pathogenic/likely pathogenic variant in MUTYH can consider early and increased surveillance for colon cancer if they have a first degree relative with colon cancer (18). Moreover, the discovery of the single MUTYH variant also may have a significant impact on this individual's family members, who may need to consider increased surveillance, based on the presence of one or more clinically significant MUTYH variants. Individuals with biallelic pathogenic/likely pathogenic variants in MUTYH are associated with a lifetime risk of colon cancer of up to 80% (58 and 59).

Detection of variants is more common in mutigene testing due to the multiplicity of genes tested. Slavin et al. summarized the results from 348 commercial mutigene panel tests ordered by providers in more than 250 practice settings across the United States. A total of 348 commercial mutigene panel tests ordered by providers in 2014 were reviewed and discussed during a weekly case conference. The proportion of clinically actionable results was reported as 17% for panels that included genes of both high and moderate penetrance, and 6.2% for panels that included only genes of high penetrance. When considering all variants identified in this group of patients, the proportion of VUSs was 42%. For 39% of patients, their test results were uninformative. The authors defined uninformative as an individual whose panel results revealed only benign variants and/or likely benign variants, or no variants of any classification detected. In their conclusions, the authors emphasized the importance of pre-test cancer risk assessment, due to the expected higher percentages of positive, non-clinically actionable variants, ambiguous results, and unexpected results with mutigene panel testing (60).

The 34-gene cancer predisposition panel disclosed herein demonstrated satisfactory performance for use in a clinical laboratory, with high sensitivity and specificity for SNVs, small indels, and an exon-level CNVs. The panel can provide clinically significant information for cancer risk assessment. Mutigene panel testing utilizing NGS may increase detection of pathogenic mutations compared to single-gene testing.

The aforementioned examples serve to illustrate aspects of the present disclosure. These examples are in no way intended to limit the scope of the methods.

The methods illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof. It is recognized that various modifications are possible within the scope of the disclosure claimed. Thus, it should be understood that although the present disclosure has been specifically disclosed by preferred embodiments and optional features, modification and variation of the disclosure embodied therein herein disclosed may be resorted to by those skilled in the art, and that such modifications and variations are considered to be within the scope of this disclosure.

The disclosure has been described broadly and generically herein. Each of the narrower species and subgeneric groupings falling within the generic disclosure also form part of the methods. This includes the generic description of the methods with a proviso or negative limitation removing any subject matter from the genus, regardless of whether or not the excised material is specifically recited herein.

Other embodiments are within the following claims. In addition, where features or aspects of the methods are described in terms of Markush groups, those skilled in the art will recognize that the disclosure is also thereby described in terms of any individual member or subgroup of members of the Markush group.

INCORPORATION BY REFERENCE

All references, articles, publications, patents, patent publications, and patent applications cited herein are incorporated by reference in their entireties for all purposes.

However, mention of any reference, article, publication, patent, patent publication, and patent application cited herein is not, and should not be taken as, an acknowledgment or any form of suggestion that they constitute valid prior art or form part of the common general knowledge in any country in the world.

REFERENCES

1. Society, A. C. (2018). Family Cancer Syndromes.
2. Mardis, E. R. (2011). A decade's perspective on DNA sequencing technology. Nature 470, 198-203.
3. Li, Y., Arellano, A. R., Bare, L. A., Bender, R. A., Strom, C. M., and Devlin, J. J. (2017). A Multigene Test Could Cost-Effectively Help Extend Life Expectancy for Women at Risk of Hereditary Breast Cancer. Value Health 20, 547-555.
4. Oncology, A. S.o.C. (2018, December). Genetics Toolkit.
5. Antoniou A, P. P., Narod S, et al. (2003). Average risks of breast and ovarian cancer associated with BRCA1 or BRCA2 mutations detected in case series unselected for family history: a combined analysis of 22 studies. Am J Hum Genet 72, 1117-1130.
6. G., C. S.a.P. (2007). Meta-analysis of BRCA1 and BRCA2 penetrance. J Clin Oncol 25, 1329-1333.
7. Bonadona V, B. B., Olschwang S, et al. (2011). Cancer risks associated with germline mutations in MLH1, MSH2, and MSH6 in lynch syndrome. JAMA 305, 2304-2310.
8. Moller, P., Seppala, T., Bernstein, I., Holinski-Feder, E., Sala, P., Evans, D. G., Lindblom, A., Macrae, F., Blanco, I., Sijmons, R., et al. (2017). Cancer incidence and survival in Lynch syndrome patients receiving colonoscopic and gynaecological surveillance: first report from the prospective Lynch syndrome database. Gut 66, 464-472.
9. Vasen H F, S. A., Menko F H, et al. (2001). MSH2 mutation carriers are at higher risk of cancer than MLH1 mutation carriers: a study of hereditary nonpolyposis colorectal cancer families. Clin Oncol 19, 4074-4080.
10. Loveday, C., Turnbull, C., Ruark, E., Xicola, R. M., Ramsay, E., Hughes, D., Warren-Perry, M., Snape, K., Breast Cancer Susceptibility, C., Eccles, D., et al. (2012). Germline RAD51C mutations confer susceptibility to ovarian cancer. Nat Genet 44, 475-476; author reply 476.
11. Song, H., Dicks, E., Ramus, S. J., Tyrer, J. P., Intermaggio, M. P., Hayward, J., Edlund, C. K., Conti, D., Harrington, P., Fraser, L., et al. (2015). Contribution of Germline Mutations in the RAD51B, RAD51C, and RAD51D Genes to Ovarian Cancer in the Population. J Clin Oncol 33, 2901-2907.
12. Choi, Y. H., Cotterchio, M., McKeown-Eyssen, G., Neerav, M., Bapat, B., Boyd, K., Gallinger, S., McLaughlin, J., Aronson, M., and Briollais, L. (2009). Penetrance of colorectal cancer among MLH1/MSH2 carriers participating in the colorectal cancer familial registry in Ontario. Hered Cancer Clin Pract 7, 14.
13. Dowty, J. G., Win, A. K., Buchanan, D. D., Lindor, N. M., Macrae, F. A., Clendenning, M., Antill, Y. C., Thibodeau, S. N., Casey, G., Gallinger, S., et al. (2013). Cancer risks for MLH1 and MSH2 mutation carriers. Hum Mutat 34, 490-497.
14. Ramsoekh, D., Wagner, A., van Leerdam, M. E., Dooijes, D., Tops, C. M., Steyerberg, E. W., and Kuipers, E. J. (2009). Cancer risk in MLH1, MSH2 and MSH6 mutation carriers; different risk profiles may influence clinical management. Hered Cancer Clin Pract 7, 17.
15. Stoffel, E., Mukherjee, B., Raymond, V. M., Tayob, N., Kastrinos, F., Span, J., Wang, F., Bandipalliam, P., Syngal, S., and Gruber, S. B. (2009). Calculation of risk of colorectal and endometrial cancer among patients with Lynch syndrome. Gastroenterology 137, 1621-1627.
16. Syngal, S., Brand, R. E., Church, J. M., Giardiello, F. M., Hampel, H. L., Burt, R. W., and American College of, G. (2015). ACG clinical guideline: Genetic testing and management of hereditary gastrointestinal cancer syndromes. Am J Gastroenterol 110, 223-262; quiz 263.
17. van der Post, R. S., Kiemeney, L. A., Ligtenberg, M. J., Witjes, J. A., Hulsbergen-van de Kaa, C. A., Bodmer, D., Schaap, L., Kets, C. M., van Krieken, J. H., and Hoogerbrugge, N. (2010). Risk of urothelial bladder cancer in Lynch syndrome is increased, in particular among MSH2 mutation carriers. J Med Genet 47, 464-470.
18. Network, N. C. C. (2018). NCCN Clinical Practice Guidelines in Oncology (NCCN Guidelines®): Genetic/Familial High-Risk Assessment: Colorectal 19. Kastrinos F, M. B., Tayob N, et al. (2009). Risk of pancreatic cancer in families with Lynch syndrome. JAMA 302, 1790-1795.
20. Kurian, A. W., and Ford, J. M. (2015). Multigene Panel Testing in Oncology Practice: How Should We Respond? JAMA Oncol 1, 277-278.
21. Ricker, C., Culver, J. O., Lowstuter, K., Sturgeon, D., Sturgeon, J. D., Chanock, C. R., Gauderman, W. J., McDonnell, K. J., Idos, G. E., and Gruber, S. B. (2016). Increased yield of actionable mutations using multi-gene panels to assess hereditary cancer susceptibility in an ethnically diverse clinical cohort. Cancer Genet 209, 130-137.
22. Robson, M. E., Bradbury, A. R., Arun, B., Domchek, S. M., Ford, J. M., Hampel, H. L., Lipkin, S. M., Syngal, S., Wollins, D. S., and Lindor, N. M. (2015). American Society of Clinical Oncology Policy Statement Update: Genetic and Genomic Testing for Cancer Susceptibility. J Clin Oncol 33, 3660-3667.
23. Oncologists., A.C.o.P.B.-.-G.A.C.o.G.S.o.G. (2017). ACOG Practice Bulletin No. 182: Hereditary breast and ovarian cancer syndrome. Obstet Gynecol 130, e110-e126.
24. Network, N. C. C. (2018). NCCN Clinical Practice Guidelines in Oncology (NCCN Guidelines®): Gastric Cancer.
25. Network, N. C. C. (2019). NCCN Clinical Practice Guidelines in Oncology (NCCN Guidelines®): Genetic/Familial High-Risk Assessment: Breast and Ovarian
26. Network, N. C. C. (2018). NCCN Clinical Practice Guidelines in Oncology (NCCN Guidelines®): Prostate Cancer.
27. Randall, L. M., Pothuri, B., Swisher, E. M., Diaz, J. P., Buchanan, A., Witkop, C. T., Bethan Powell, C., Smith, E. B., Robson, M. E., Boyd, J., et al. (2017). Multi-disciplinary summit on genetics services for women with gynecologic cancers: A Society of Gynecologic Oncology White Paper. Gynecol Oncol 146, 217-224.
28. Alliance, V. (2017). VHLA Suggested Active Surveillance Guidelines.
29. Alkan, C., Kidd, J. M., Marques-Bonet, T., Aksay, G., Antonacci, F., Hormozdiari, F., Kitzman, J. O., Baker, C., Malig, M., Mutlu, O., et al. (2009). Personalized copy number and segmental duplication maps using next-generation sequencing. Nat Genet 41, 1061-1067.
30. Chiang, D. Y., Getz, G., Jaffe, D. B., O'Kelly, M. J., Zhao, X., Carter, S. L., Russ, C., Nusbaum, C., Meyerson, M., and Lander, E. S. (2009). High-resolution mapping of copy-number alterations with massively parallel sequencing. Nat Methods 6, 99-103.
31. Yoon, S., Xuan, Z., Makarov, V., Ye, K., and Sebat, J. (2009). Sensitive and accurate detection of copy number variants using read depth of coverage. Genome Res 19, 1586-1592.
32. Karbassi, I., Maston, G. A., Love, A., DiVincenzo, C., Braastad, C. D., Elzinga, C. D., Bright, A. R., Previte, D., Zhang, K., Rowland, C. M., et al. (2016). A Standardized DNA Variant Scoring System for Pathogenicity Assessments in Mendelian Disorders. Hum Mutat 37, 127-134.
33. Richards, S., Aziz, N., Bale, S., Bick, D., Das, S., Gastier-Foster, J., Grody, W. W., Hegde, M., Lyon, E., Spector, E., et al. (2015). Standards and guidelines for the interpretation of sequence variants: a joint consensus recommendation of the American College of Medical Genetics and Genomics and the Association for Molecular Pathology. Genet Med 17, 405-424.
34. Landrum, M. J., Lee, J. M., Riley, G. R., Jang, W., Rubinstein, W. S., Church, D. M., and Maglott, D. R. (2014). ClinVar: public archive of relationships among sequence variation and human phenotype. Nucleic Acids Res 42, D980-985.
35. Matthijs, G., Souche, E., Alders, M., Corveleyn, A., Eck, S., Feenstra, I., Race, V., Sistermans, E., Sturm, M., Weiss, M., et al. (2016). Guidelines for diagnostic next-generation sequencing. Eur J Hum Genet 24, 2-5.
36. Kumaran, M., Cass, C. E., Graham, K., Mackey, J. R., Hubaux, R., Lam, W., Yasui, Y., and Damaraju, S. (2017). Germline copy number variations are associated with breast cancer risk and prognosis. Sci Rep 7, 14621.
37. Hu, L., Yao, X., Huang, H., Guo, Z., Cheng, X., Xu, Y., Shen, Y., Xu, B., and Li, D. (2018). Clinical significance of germline copy number variation in susceptibility of human diseases. J Genet Genomics 45, 3-12.
38. Zare, F., Hosny, A., and Nabavi, S. (2018). Noise cancellation using total variation for copy number variation detection. BMC Bioinformatics 19, 361.
39. Zhao M, W. Q., Wang Q, et al. (2013). Computational tools for copy number variation (CNV) detection using next-generation sequencing data: features and perspectives. BMC Bioinformatics 14 Suppl S1.
40. Soukupova, J., Zemankova, P., Lhotova, K., Janatova, M., Borecka, M., Stolarova, L., Lhota, F., Foretova, L., Machackova, E., Stranecky, V., et al. (2018). Validation of CZECANCA (CZEch CAncer paNel for Clinical Application) for targeted NGS-based analysis of hereditary cancer syndromes. PLoS One 13, e0195761.
41. Millson, A., Lewis, T., Pesaran, T., Salvador, D., Gillespie, K., Gau, C. L., Pont-Kingdon, G., Lyon, E., and Bayrak-Toydemir, P. (2015). Processed Pseudogene Confounding Deletion/Duplication Assays for SMAD4. J Mol Diagn 17, 576-582.
42. Domchek, S. M., Friebel, T. M., Singer, C. F., Evans, D. G., Lynch, H. T., Isaacs, C., Garber, J. E., Neuhausen, S. L., Matloff, E., Eeles, R., et al. (2010). Association of risk-reducing surgery in BRCA1 or BRCA2 mutation carriers with cancer risk and mortality. JAMA 304, 967-975.
43. Finch, A. P., Lubinski, J., Moller, P., Singer, C. F., Karlan, B., Senter, L., Rosen, B., Maehle, L., Ghadirian, P., Cybulski, C., et al. (2014). Impact of oophorectomy on cancer incidence and mortality in women with a BRCA1 or BRCA2 mutation. J Clin Oncol 32, 1547-1553.
44. Metcalfe, K., Gershman, S., Ghadirian, P., Lynch, H. T., Snyder, C., Tung, N., Kim-Sing, C., Eisen, A., Foulkes, W. D., Rosen, B., et al. (2014). Contralateral mastectomy and survival after breast cancer in carriers of BRCA1 and BRCA2 mutations: retrospective analysis. BMJ 348, g226.
45. Heemskerk-Gerritsen, B. A., Seynaeve, C., van Asperen, C. J., Ausems, M. G., Collee, J. M., van Doom, H. C., Gomez Garcia, E. B., Kets, C. M., van Leeuwen, F. E., Meijers-Heijboer, H. E., et al. (2015). Breast cancer risk after salpingo-oophorectomy in healthy BRCA1/2 mutation carriers: revisiting the evidence for risk reduction. J Natl Cancer Inst 107.
46. Audeh, M. W., Carmichael, J., Penson, R. T., Friedlander, M., Powell, B., Bell-McGuinn, K. M., Scott, C., Weitzel, J. N., Oaknin, A., Loman, N., et al. (2010). Oral poly(ADP-ribose) polymerase inhibitor olaparib in patients with BRCA1 or BRCA2 mutations and recurrent ovarian cancer: a proof-of-concept trial. The Lancet 376, 245-251.

47. Ledermann, J., Harter, P., Gourley, C., Friedlander, M., Vergote, I., Rustin, G., Scott, C. L., Meier, W., Shapira-Frommer, R., Safra, T., et al. (2014). Olaparib maintenance therapy in patients with platinum-sensitive relapsed serous ovarian cancer: a preplanned retrospective analysis of outcomes by BRCA status in a randomised phase 2 trial. The Lancet Oncology 15, 852-861.
48. Robson, M., Im, S. A., Senkus, E., Xu, B., Domchek, S. M., Masuda, N., Delaloge, S., Li, W., Tung, N., Armstrong, A., et al. (2017). Olaparib for Metastatic Breast Cancer in Patients with a Germline BRCA Mutation. N Engl J Med 377, 523-533.
49. Swisher, E. M., Lin, K. K., Oza, A. M., Scott, C. L., Giordano, H., Sun, J., Konecny, G. E., Coleman, R. L., Tinker, A. V., O'Malley, D. M., et al. (2017). Rucaparib in relapsed, platinum-sensitive high-grade ovarian carcinoma (ARIEL2 Part 1): an international, multicentre, open-label, phase 2 trial. The Lancet Oncology 18, 75-87.
50. Gallego, C. J., Shirts, B. H., Bennette, C. S., Guzauskas, G., Amendola, L. M., Horike-Pyne, M., Hisama, F. M., Pritchard, C. C., Grady, W. M., Burke, W., et al. (2015). Next-Generation Sequencing Panels for the Diagnosis of Colorectal Cancer and Polyposis Syndromes: A Cost-Effectiveness Analysis. J Clin Oncol 33, 2084-2091.
51. Cragun, D., Radford, C., Dolinsky, J. S., Caldwell, M., Chao, E., and Pal, T. (2014). Panel-based testing for inherited colorectal cancer: a descriptive study of clinical testing performed by a US laboratory. Clin Genet 86, 510-520.
52. Kurian, A. W., Hare, E. E., Mills, M. A., Kingham, K. E., McPherson, L., Whittemore, A. S., McGuire, V., Ladabaum, U., Kobayashi, Y., Lincoln, S. E., et al. (2014). Clinical evaluation of a multiple-gene sequencing panel for hereditary cancer risk assessment. J Clin Oncol 32, 2001-2009.
53. Kapoor, N. S., Curcio, L. D., Blakemore, C. A., Bremner, A. K., McFarland, R. E., West, J. G., and Banks, K. C. (2015). Multigene Panel Testing Detects Equal Rates of Pathogenic BRCA1/2 Mutations and has a Higher Diagnostic Yield Compared to Limited BRCA1/2 Analysis Alone in Patients at Risk for Hereditary Breast Cancer. Ann Surg Oncol 22, 3282-3288.
54. Tung, N., Domchek, S. M., Stadler, Z., Nathanson, K. L., Couch, F., Garber, J. E., Offit, K., and Robson, M. E. (2016). Counselling framework for moderate-penetrance cancer-susceptibility mutations. Nat Rev Clin Oncol 13, 581-588.
55. LaDuca, H., Stuenkel, A. J., Dolinsky, J. S., Keiles, S., Tandy, S., Pesaran, T., Chen, E., Gau, C. L., Palmaer, E., Shoaepour, K., et al. (2014). Utilization of multigene panels in hereditary cancer predisposition testing: analysis of more than 2,000 patients. Genet Med 16, 830-837.
56. Susswein, L. R., Marshall, M. L., Nusbaum, R., Vogel Postula, K. J., Weissman, S. M., Yackowski, L., Vaccari, E. M., Bissonnette, J., Booker, J. K., Cremona, M. L., et al. (2016). Pathogenic and likely pathogenic variant prevalence among the first 10,000 patients referred for next-generation cancer panel testing. Genet Med 18, 823-832.
57. Marie Eliade, J. S., Amandine Baurand, Caroline Jacquot, et al. (2017). The transfer of multigene panel testing for hereditary breast and ovarian cancer to healthcare: What are the implications for the management of patients and families? Oncotarget 8, 1957-1971.
58. Win A K, D. J., Cleary S P, et al. (2014). Risk of Colorectal Cancer for Carriers of mutations in MUTYH, with and withouth a Family History of Cancer. Gastroenterology 146, 1208-1211.
59. Aretz S, G. M., Hes F. (2013). Clinical utility gene card for: MUTYH-associated polyposis (MAP), Autosomal recessive colorectal adenomatous polyposis, Multiple colorectal adneomas, Multiple andnomatous polyposis (MAP)-2012 Update. Eur J Hum Genet 21.
60. Slavin, T. P., Niell-Swiller, M., Solomon, I., Nehoray, B., Rybak, C., Blazer, K. R., and Weitzel, J. N. (2015). Clinical Application of Multigene Panels: Challenges of Next-Generation Counseling and Cancer Risk Management. Front Oncol 5, 208.
61. Health, G.A.f.G.a. (2016). GENOMICS. A federated ecosystem for sharing genomic, clinical data. Science 352, 1278-1280.
62. Acmg Board Of, D. (2017). Laboratory and clinical genomic data sharing is crucial to improving genetic health care: a position statement of the American College of Medical Genetics and Genomics. Genet Med 19, 721-722.
63. Resource, C. G. (2019). About ClinGen.
64. Health, G.A.f.G.a. (2017). Enabling responsible genomic data sharing for the benefit of human health.
65. S, L.K.a.T. (2014). Free the Data. Genet Test Mol Biomarkers 18, 1-2.

The invention claimed is:

1. A method for detecting at least one mutation in a plurality of hereditary cancer-related genes in a biological sample, the method comprising:
   (a) extracting genomic DNA from a biological sample obtained from a patient,
   (b) generating a first library and a second library of amplicons corresponding to the plurality of hereditary cancer-related genes comprising of APC, ATM, BARD1, BMPR1A, BRCA1, BRCA2, BRIP1, CDH1, CDK4, CDKN2A, EPCAM, MEN1, MLH1, MSH2, MSH6, MUTYH, NBN, NF1, PALB2, POLD1, POLE, PTEN, RAD51C, RAD51D, RET, SDHB, SDHC, SDHD, SMAD4, STK11, VHL, TP53, PMS2, and CHEK2, wherein
      (i) generating the first library comprises amplifying a plurality of bait-captured gene sequences corresponding to APC, ATM, BARD1, BMPR1A, BRCA1, BRCA2, BRIP1, CDH1, CDK4, CDKN2A, EPCAM, MEN1, MLH1, MSH2, MSH6, MUTYH, NBN, NF1, PALB2, POLD1, POLE, PTEN, RAD51C, RAD51D, RET, SDHB, SDHC, SDHD, SMAD4, STK11, VHL, and TP53 from the genomic DNA extracted from (a); and
      (ii) generating the second library comprises amplifying exon 11 to 15 of PMS2 and CHEK2 from the genomic DNA extracted from (a) using long-range PCR to generate a plurality of PMS2 and CHEK2 amplicons using primers selected from SEQ ID NOs: 1-4;
   (c) detecting at least one mutation in at least one of the amplicons of the first library and the second library using high throughput massive parallel sequencing.

2. The method of claim 1, wherein the biological sample is plasma, serum, or whole blood.

3. The method of claim 1, wherein the biological sample is a dried human biological sample.

4. The method of claim 1, wherein an adaptor sequence is ligated to at least one end of the plurality of bait-captured gene sequences.

5. The method of claim 1, wherein an adaptor sequence is ligated to both ends of the plurality of bait-captured gene sequences.

6. The method of claim 1, wherein the plurality of PMS2 amplicons lack an adaptor sequence.

7. The method of claim 1, wherein the plurality of PMS2 amplicons are generated using a forward primer comprising the sequence of SEQ ID NO:3 and a reverse primer comprising the sequence of SEQ ID NO:4.

8. The method of claim 1, wherein the plurality of CHEK2 amplicons lack an adapter sequence.

9. The method of claim 1, wherein the plurality of CHEK2 amplicons are generated using a forward primer comprising the sequence of SEQ ID NO:1 and a reverse primer comprising the sequence of SEQ ID NO:2.

* * * * *